United States Patent [19]

Schumacher

[11] Patent Number: 5,429,072
[45] Date of Patent: Jul. 4, 1995

[54] PRESSURE REDUCER FOR AN ANIMAL WATERING TROUGH

[75] Inventor: Egon Schumacher, Barnstorf, Germany

[73] Assignee: Lubing Maschinenfabrik Ludwig Bening GmbH & Co. KG, Germany

[21] Appl. No.: 118,974

[22] Filed: Sep. 9, 1993

[30] Foreign Application Priority Data

Sep. 10, 1992 [DE] Germany .............. 9212207 U

[51] Int. Cl.⁶ .................. A01K 7/00; F16K 31/12
[52] U.S. Cl. ................. 119/74; 137/505.46; 137/599; 119/72
[58] Field of Search .................. 119/72, 72.5, 74; 137/505.46, 599, 563, 238

[56] References Cited

U.S. PATENT DOCUMENTS

| | | | |
|---|---|---|---|
| 4,991,621 | 2/1991 | Strudler | 137/505.46 |
| 5,136,983 | 8/1992 | Hostetler et al. | 119/72 |
| 5,158,107 | 10/1992 | Teay | 137/505.46 |
| 5,184,571 | 2/1993 | Hostetler et al. | 119/72 |
| 5,247,963 | 9/1993 | Hostetler et al. | 119/72 |

FOREIGN PATENT DOCUMENTS 2373094 12/1976 France .

Primary Examiner—John G. Weiss
Attorney, Agent, or Firm—Deveau, Colton & Marquis

[57] ABSTRACT

Pressure reducers (15) for animal watering troughs serve for reducing the water pressure of a water supply pipe which feeds the watering line to a defined, lower watering pressure. In contrast, water of a higher rinsing pressure is required for rinsing the animal watering troughs. For this purpose, the water supply pipe must be directly connected to the watering line via a bypass which bridges the pressure reducer (15).

To avoid the bypass pipe, the pressure reducer (15) is constructed according to the invention in such a way that, by a suitable means, in particular a retaining device (47), the regulating device (46) of the pressure reducer (15) which reduces the water pressure is put out of operation in terms of functioning. The water from the water supply pipe can thus flow at non-reduced pressure through the pressure reducer (15) for rinsing the watering line.

8 Claims, 8 Drawing Sheets

PRESSURE REDUCER FOR AN ANIMAL WATERING TROUGH

The invention relates to a pressure reducer for an animal watering trough according to the preamble of Claim 1.

Animal watering troughs, specifically in particular line watering troughs, having a watering line which has a plurality of watering places, are supplied with water via a pressure reducer. The pressure reducer serves for reducing the water pressure of a water supply pipe which feeds the watering line to a defined lower pressure (watering pressure). In contrast, water of a higher pressure (rinsing pressure), namely the pressure in the water supply pipe, is required for rinsing the animal watering trough. For this purpose, the water from the water supply pipe is conducted directly to the watering line via a separate bypass which bridges the pressure reducer. This bypass is quite complex.

The invention is based on the object of providing a pressure reducer for an animal watering trough, which pressure reducer allows the animal watering trough to be changed over in a simple manner from a watering position to a rinsing position (and vice versa).

According to the invention, this object is achieved by a pressure reducer having the features of Claim 1. Due to the means according to the invention, the water inflow remains unaffected by the regulating device as required. The pressure reducer can thus be put out of operation (in terms of functioning) if required. The water can thus pass by the pressure reducer at the pressure of the water supply pipe for rinsing the animal watering trough and pass into the watering line at this (full) pressure, namely the rinsing pressure. The changeover from the watering pressure to the rinsing pressure thus takes place in the pressure reducer, which obviates the need for the bypass required in the prior art.

In one embodiment of the invention, the regulating device is retained. The regulating device consists of an actuating lever which alternatively closes or opens the water supply pipe and of a membrane which is operatively connected to the actuating lever. Either the actuating lever or the membrane can be retained. The regulating device can thus be put out of operation solely due to the fact that one of its basic elements is retained.

In another embodiment of the invention, a water inflow to the regulating device is provided with a secondary outlet aperture which can be opened as required. Water inflow having a non-reduced water pressure can take place through said secondary outlet aperture even when the regulating device keeps a main outlet aperture of the water inflow closed.

Further designs of the invention emerge from the subclaims and the description.

Preferred exemplary embodiments of the invention are explained below with reference to the drawing, in which.

Figure 2:
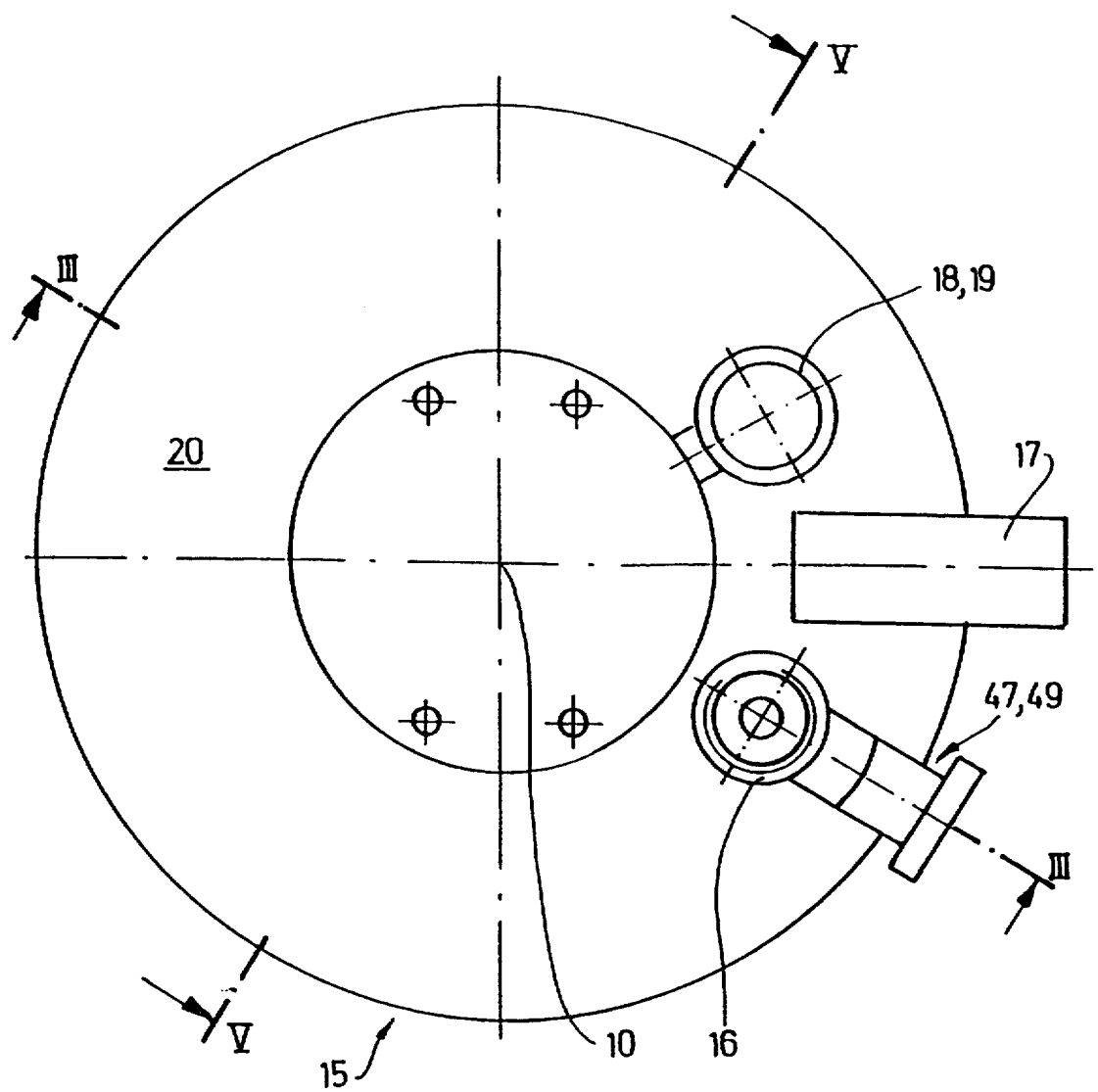
FIG. 2 shows a plan view of a pressure reducer.
Figure 3:
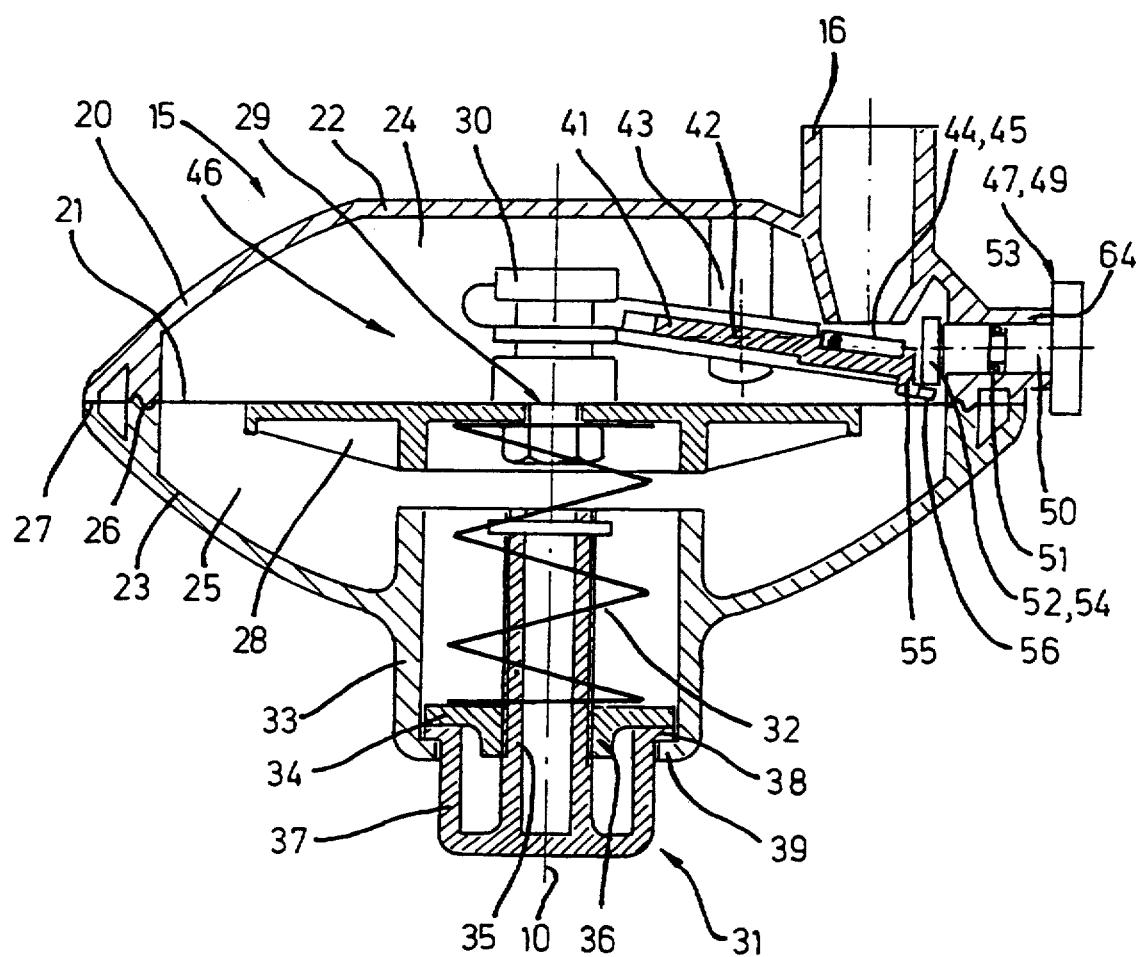
Figure 4:
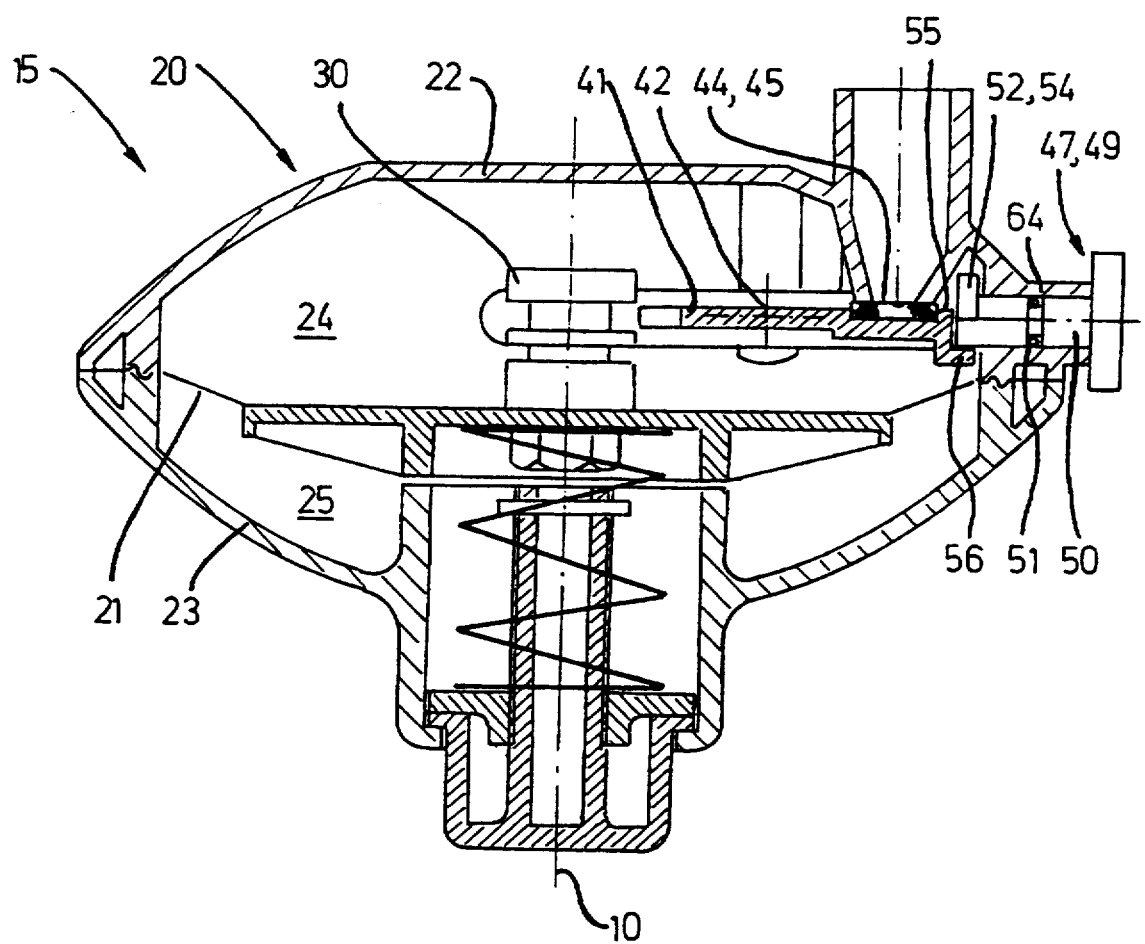
Figure 5:
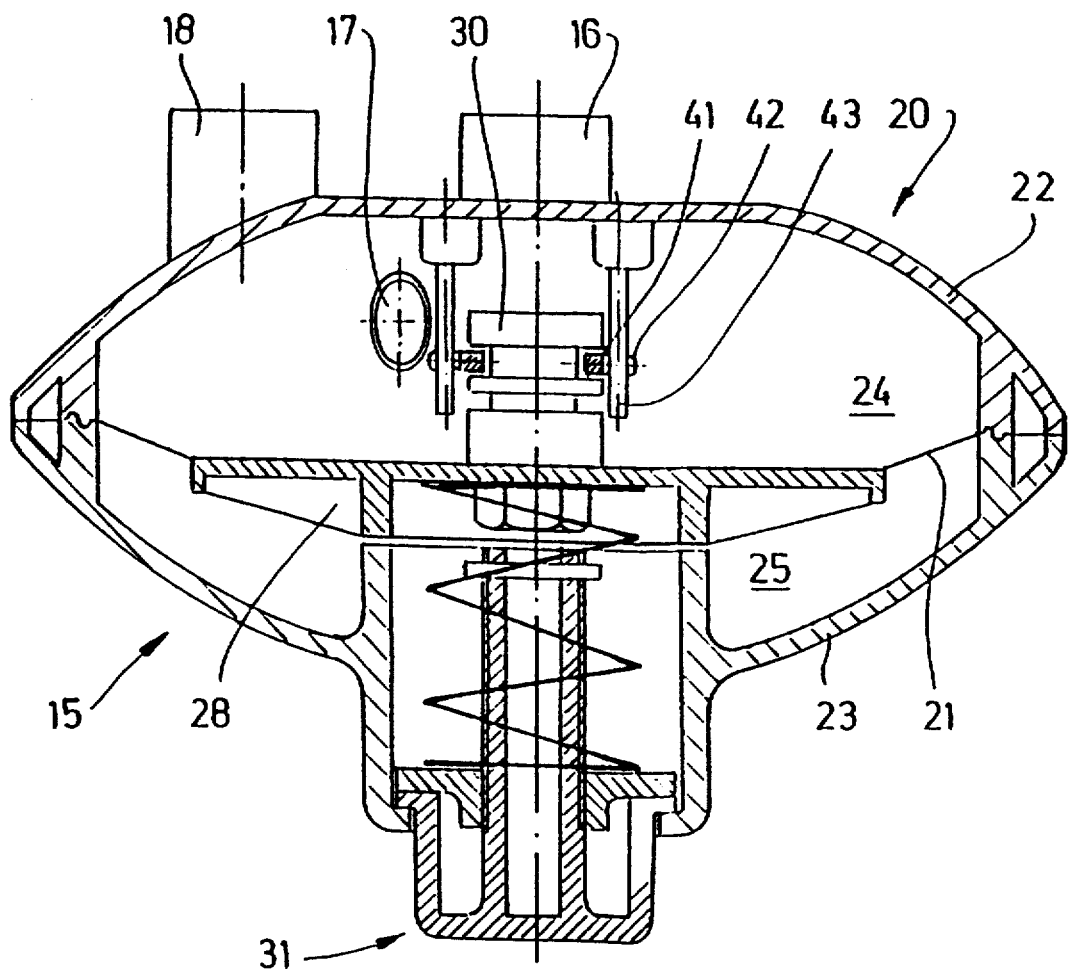
Figure 6:
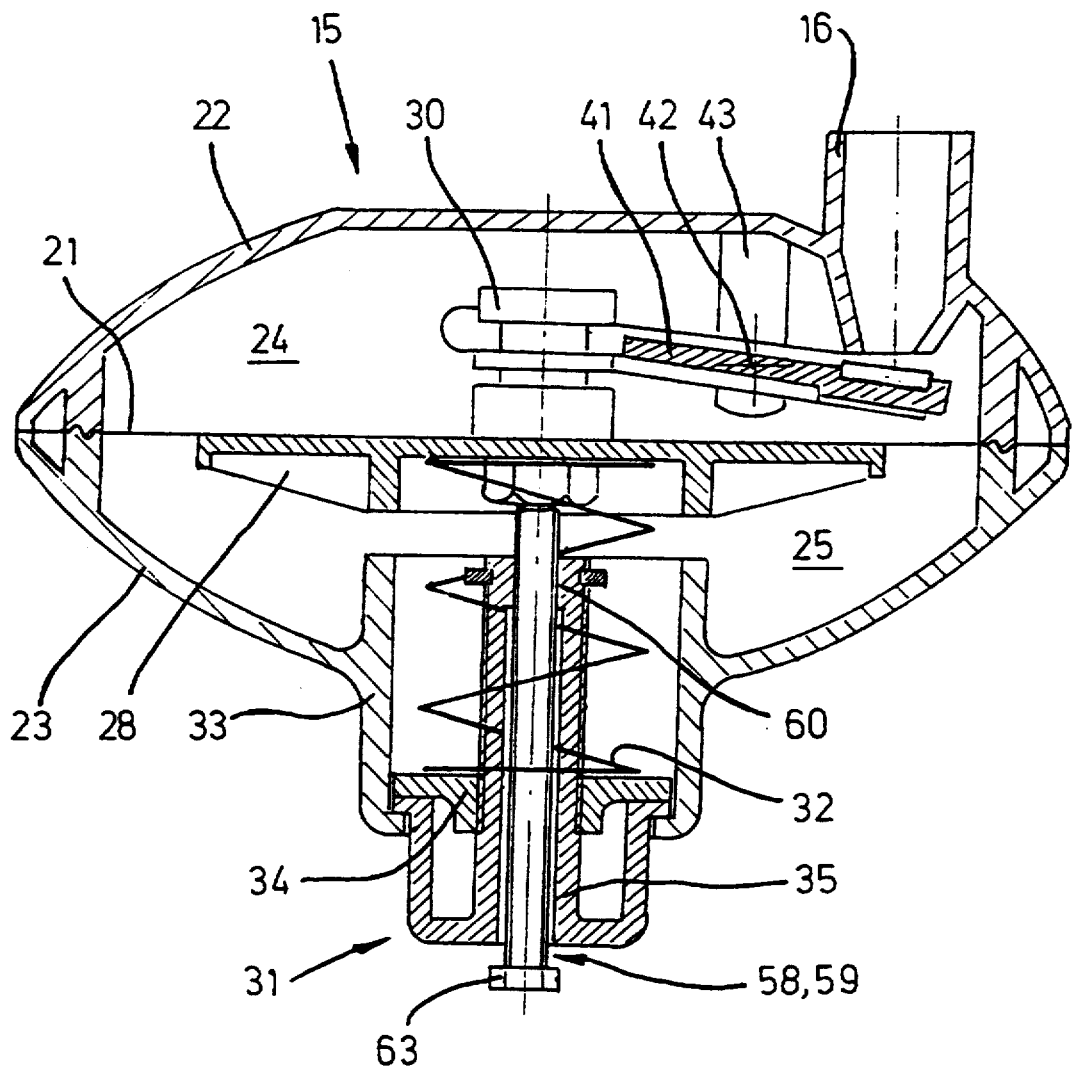
Figure 7:
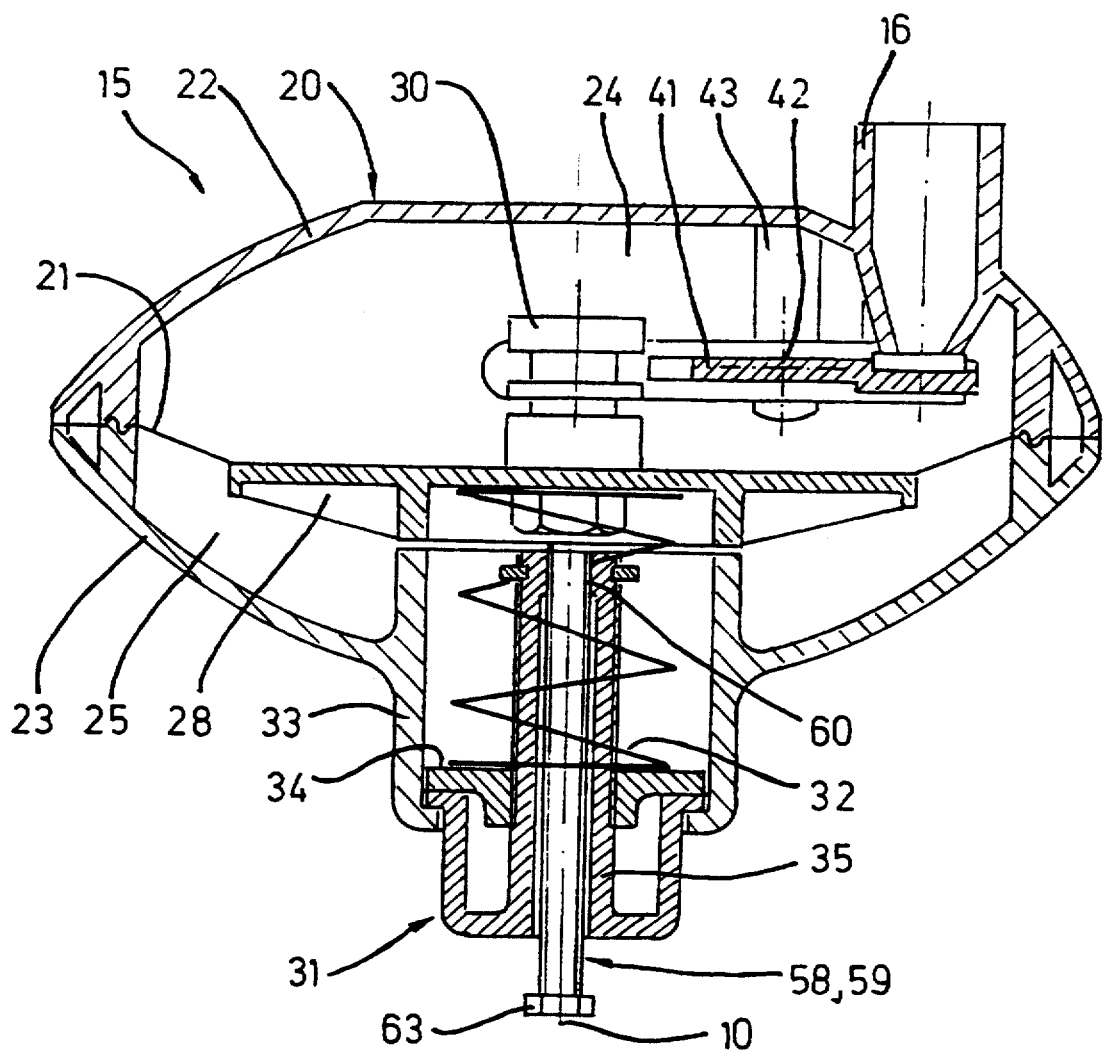
Figure 8:
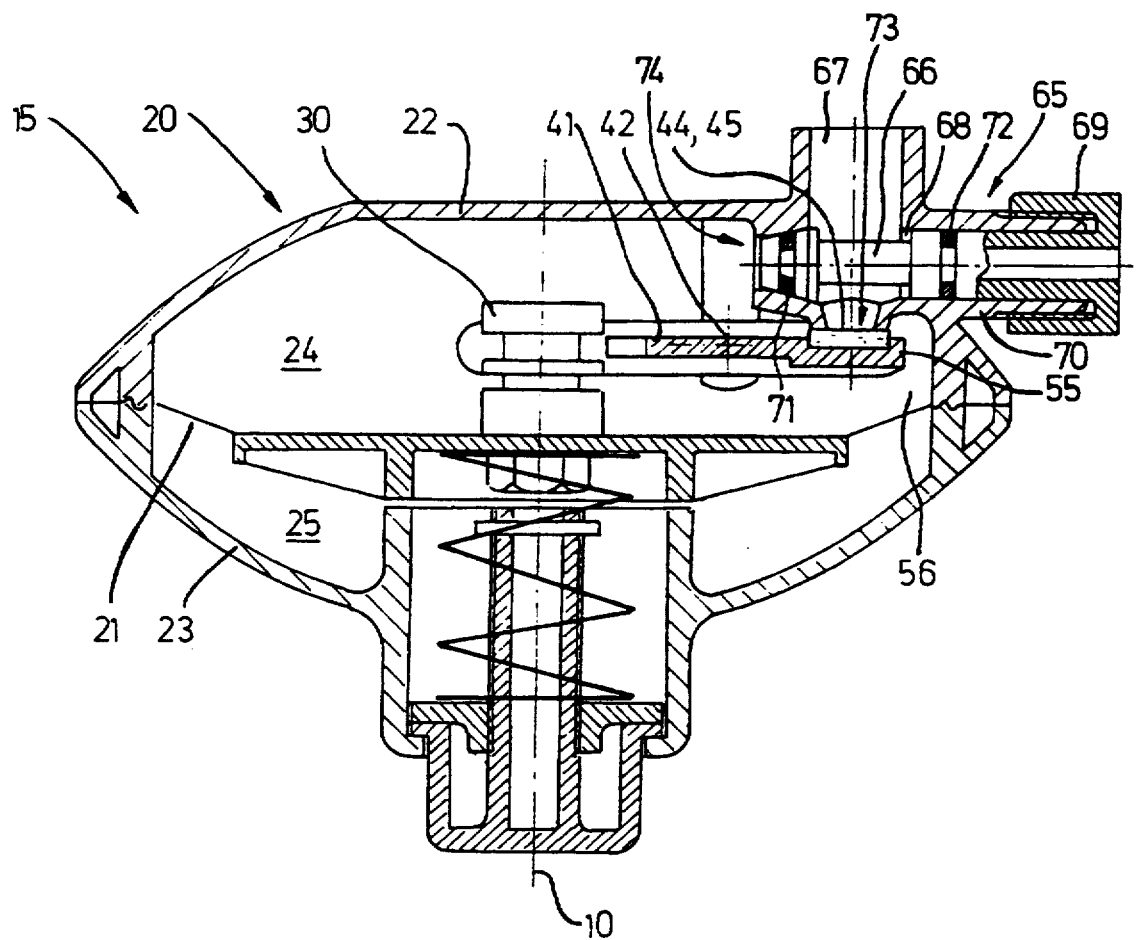

FIG. 3 shows a section III—III through the pressure reducer according to FIG. 2 with the water inflow open, FIG. 4 shows the section according to FIG. 3 with the water inflow closed, FIG. 5 shows a section V—V through the pressure reducer according to FIG. 2, FIG. 6 shows a second embodiment of the pressure reducer with the water inflow open in section in analogy to FIG. 3, FIG. 7 shows the pressure reducer according to FIG. 6 with the water inflow closed, and FIG. 8 shows a third embodiment of the pressure reducer with the water inflow closed in a section in analogy to FIG. 3.

Figure 1:
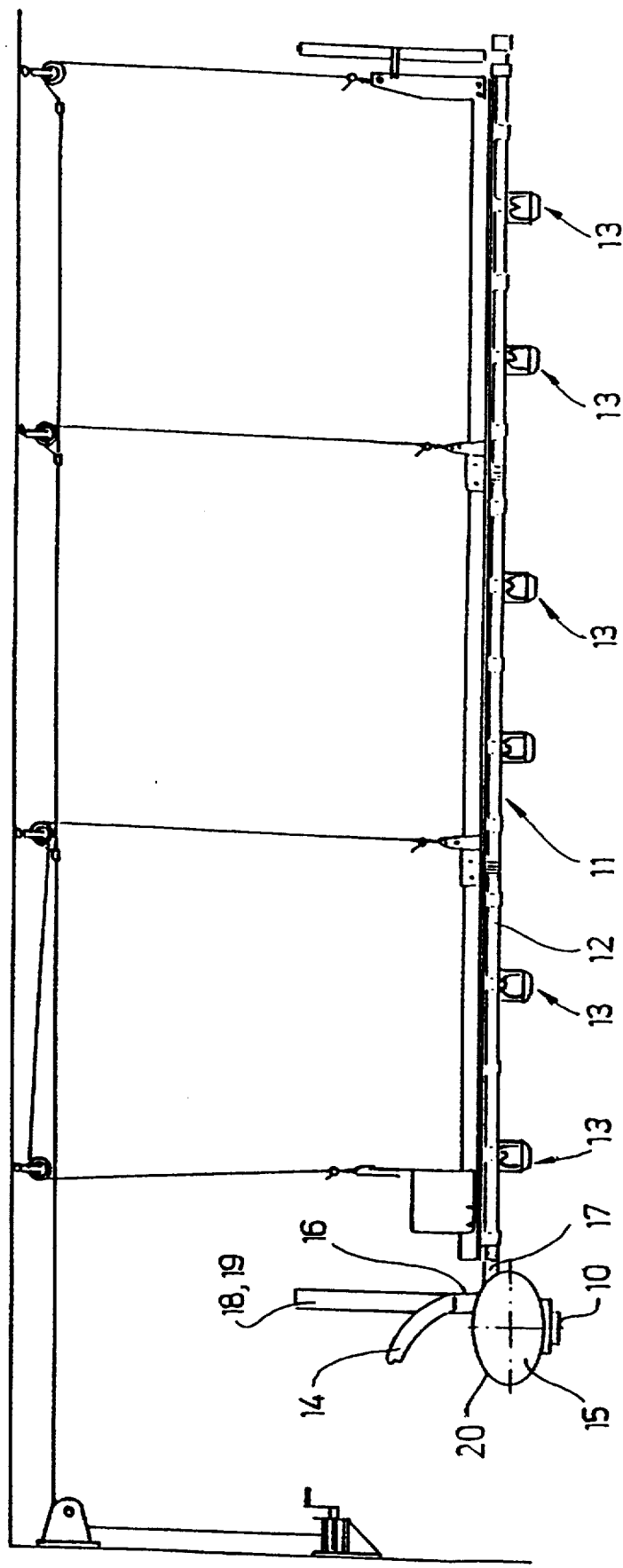
FIG. 1 shows a diagrammatic front view of an animal watering trough.

The animal watering trough illustrated in FIG. 1 is constructed as a line watering trough 11 for supplying water for small animals, in particular hens. The line watering trough 11 has a watering line 12 which is assigned a plurality of watering places 13. The watering places 13 are supplied with water by the water-conducting watering line 12. The watering line 12 is fed with water from a water feedpipe 14. A pressure reducer 15 is arranged between the water feedpipe 14 and the watering line 12.

The water feedpipe 14 is connected to a water inflow 16 of the pressure reducer 15. The water inflow 16 opens out in the pressure reducer 15 with parallel spacing from its centre-line 10. The pressure reducer 15 is connected to the watering line 12 via a water outflow 17. Furthermore, the pressure reducer 15 is provided with a venting device 18 which runs substantially parallel to the water inflow 16. The venting device 18 is assigned a venting member 19 which opens or closes the venting device 18 by pivoting. Closure of the venting device 18 is required for rinsing the line watering trough 11.

The pressure reducer 15 has a housing 20 in which a regulating device 46 is arranged. The regulating device 46 has a membrane 21 and an actuating lever 41. Perpendicular to its centre-line 10, the housing 20 is divided approximately centrally into two halves 22, 23 by the membrane 21. An upper hollow space 24, thus formed, in which the water inflow 16, the water outflow 17 and the venting device 18 also open out, constitutes a water-conducting part of the pressure reducer 15. It is separated from a lower hollow space 25 by the membrane 21. For this purpose, the membrane 21 is clamped in a water-tight manner between two adjacent, annular connecting surfaces 26, 27 of the halves 22, 23 of the housing 20.

Provided in the lower, non-water-conducting hollow space 25 is a holder 28 which is connected to the underside of the membrane 21. A bearing journal 30 extends from said holder through a central bore 29 in the membrane 21 into the upper hollow space 24 of the pressure reducer 15, the membrane 21 likewise being clamped in a sealing manner between the holder 28 and the bearing journal 30.

A setting device 31 with a prestressable compression spring 32 is located in the lower half 23 of the housing 20. The compression spring 32 bears on the one hand against the underside of the holder 28 and, on the other hand, against a non-rotatable counter-bearing 34 which is axially displaceable in a guide 33. Running through the compression spring 32 is a threaded bolt 35 which is screwed into a corresponding threaded bore 36 in the counter-bearing 34. On its underside, the threaded bolt 35 has a cap-shaped end 37 with a circumferential web 38 which is supported on a corresponding inner web 39 inside the guide 33.

By turning the threaded bolt 35, the counterbearing 34 is moved upwards or downwards. The compression spring 32 is thus prestressed to a greater or lesser extent to set the watering pressure.

Arranged in the upper hollow space 24 is the actuating lever 41 for the alternative opening and closing of the water inflow 16. The latter is linked by an end region to the bearing journal 30 connected to the membrane 21 and is thus constantly operatively connected to the membrane 21. At its other end region, the actuating lever 41 is provided with a sealing element 44 which forms a sealing surface 45. The actuating lever 41 can be tilted approximately centrally about a pivot axle 42. The actuating lever 41 is attached by the pivot axle 42 to a bearing block 43 on the inside of the upper half 22 of the housing 20. The actuating lever 41 can be pivoted in dependence on the movement of the membrane 21 in such a way that, in the end position of the membrane 21 shown in FIG. 3, the water inflow 16 is open whereas, with the membrane 21 deflected downwards according to FIG. 4, the water inflow 16 is closed. In this substantially horizontal position of the actuating lever 41, the sealing surface 45 of the actuating lever 41 closes the water inflow 16.

During the operating position of the line watering trough 11, water of higher pressure is conducted via the open water inflow 16 into the upper hollow space 180 of the pressure reducer 15 and the water inflow 16 is closed from time to time by the regulating device 46, as a result of which the higher pressure of the water feedpipe 14 is reduced to a lower watering pressure at the water outflow 17.

Changing the line watering trough 11 over from the operating position to the rinsing position takes place according to the invention by retaining the regulating device 46. A retaining device 47 serves this purpose in the exemplary embodiment of FIG. 1 to FIG. 5. By means of said retaining device, the actuating lever 41 is held in its position which releases the water inflow 16 according to FIG. 3. The pressure reducer 15 or the regulating device 46 are thus put out of operation, as a result of which water for rinsing having a higher rinsing pressure, namely the pressure in the water feedpipe 14, leaves the pressure reducer 15 via the water outflow 17.

The retaining device 47 for retaining the actuating lever 41 is formed by an actuator 49 which is mounted in the upper half 22 of the housing 20 so as to be rotatable about a horizontal axle. The actuator 49 has in the centre a cylindrical bearing journal 50 which is mounted in a water-tight manner with a sealing arrangement 51 in a corresponding cylindrical seat 64 in the upper half 22 of the housing 20. Furthermore, the actuator 49 has on one side a projection 52 and on the other side an actuating knob 53.

The projection 52 is constructed in the shape of a cam 54 which is assigned to an end 55 of the actuating lever 41 located in the hollow space 24 of the pressure reducer 15. The course of the cam 54 is such that, when the actuator 49 is turned, the actuating lever 41 is pivoted and retained and the water inflow 16 is thus fully opened (FIG. 3). In this case, the cam 54 is supported against a web 56 which is assigned to the end 55 of the actuating lever 41. Furthermore, the cam 54 is constructed in such a way that, when the actuator 49 is turned in the opposite direction, the actuating lever 41 can be pivoted freely and the water inflow 16 can be completely closed by the sealing element 44 (FIG. 4).

In a second exemplary embodiment of the pressure reducer 15 according to FIGS. 6 and 7, a retaining device 48 is provided for retaining the membrane 21. For this purpose, the retaining device 48 has an actuator 58 which fixes the membrane 21 in the position illustrated in FIG. 6. The actuator 58 is constructed as a screw 59 which is axially movable on the centre-line 10. The screw 59 is held in a corresponding threaded bore 60 inside the setting device 31 for the compression spring 32.

The retaining device 48 is actuated by the screw 59 being turned correspondingly at its head 63 and thereby being displaced axially on the centre-line 10. In the position of the pressure reducer 15 illustrated in FIG. 6, the screw 59 is turned into its upper end position, the membrane 21 being retained. The actuating lever 41 which is operatively connected to the membrane 21 is thus pivoted in such a way that the water inflow is completely opened. The pressure reducer 15 is thus in the rinsing position.

In contrast, the screw 59 in FIG. 7 is screwed into its lower end position. In this case, the movement both of the membrane 21 and of the actuating lever 41 is unaffected so that they can assume a position in which the water inflow 16 can be closed by the membrane 21 and the actuating lever 41 to reduce the water pressure in the water feedpipe 14 to the watering pressure.

The third exemplary embodiment of the invention shown in FIG. 8 differs from the pressure reducer 15 shown in the preceding Figures due to the fact that the retaining devices 47 and 48 are replaced by a valve assigned to the water inflow 16. The valve 65 has a valve pin 66 which is mounted in a valve bore 68 running transversely to the bore 67 of the water inflow 16. The centre-lines of the bore 67 and of the valve bore 68 thus intersect.

At its end located outside the pressure reducer 15, the valve pin 66 is provided with a cap 69 which has an internal thread and is screwed onto a corresponding external thread of a cylindrical continuation 70 of the valve bore 68. By turning the valve pin 66, as a result of the threads which are engaged with one another on the cap 69 on one side and of the continuation 70 on the other side, the valve pin 66 is moved back and forth axially in the valve bore 68.

The valve pin 66 is provided with two sealing rings 71 and 72 which are assigned to its opposite end regions for sealing the sections of the valve bore 68 located on opposite sides of the bore 67. In this way the valve bore is closed, as illustrated in FIG. 8. This position of the valve pin 66 corresponds to the watering position of the pressure reducer 15, in that water conducted from the water feedpipe 14 at the top into the bores 67 can only pass through the main outlet aperture 73 located at the lower end of the bore 68 into the upper (water-conducting) hollow space 24 of the pressure reducer 15.

To change the pressure reducer 15 over to the rinsing position, it is only necessary to open the valve 65 by turning the valve pin 66 in such a way that it moves to the right (relative to the illustration in FIG. 8), as a result of which the end of the valve pin 66 directed away from the cap 69 opens the end of the valve bore 68 which opens out into the hollow space 24 of the pressure reducer 15. This end of the valve bore 68 which opens out into the hollow space 24 forms a secondary outlet aperture 74 through which the water coming from the water feedpipe 14 and having non-reduced pressure can pass into the hollow space 24, specifically even if—as illustrated in FIG. 8—the main outlet aperture 73 is closed by the actuating lever 41 of the regulating device 46. In this way, the regulating device 46 is bypassed by the secondary outlet aperture 74 located inside the pressure reducer 15.

I claim:

1. Pressure reducer for an animal watering trough, having a housing and a regulating device arranged therein for the alternative opening and closing of a water inflow, characterized by a multi-directional valve means assigned to said water inflow which can be actuated in such a way that said water inflow is unaffected by said regulating device as required, wherein said multi-directional valve means has a main outlet aperture which can alternatively be closed or released by an actuating lever of said regulating device, and a secondary outlet aperture which can be opened by a valve pin as required.

2. Pressure reducer for an animal watering trough comprising a housing, a first water inflow aperture leading into said housing, a regulating device being arranged in said housing, said regulating device being assigned to said first water inflow aperture for alternatively closing and opening said first water inflow aperture, and a second water inflow aperture leading into said housing, said second water inflow aperture being independent of said regulating device, and said second water inflow aperture further being provided with means for alternatively opening and closing said second water inflow aperture.

3. Pressure reducer according to claim 2, characterized in that when said first water inflow aperture is closed and said second water inflow aperture is opened, water is supplied to said housing of said pressure reducer through said second water inflow aperture and from said housing of said pressure reducer to the animal watering trough.

4. Pressure reducer according to claim 2, characterized in that a common water inflow to said housing is assigned to both said first water inflow aperture and said second water inflow aperture.

5. Pressure reducer according to claim 4 characterized in that said means for alternatively opening and closing said second water inflow is a selector valve assigned to said first water inflow aperture, and said second water inflow aperture for opening and closing said first water inflow aperture and said second water inflow aperture such that when said first water inflow aperture is opened, said second water inflow aperture is closed, and when said first water inflow aperture is closed, said second water inflow aperture is opened.

6. Pressure reducer according to claim 5, characterized in that said first water inflow aperture of said selector valve is designed as a main inflow aperture, which can be alternatively closed and opened, and in that said second water inflow aperture is designed as a secondary inflow aperture, said selector valve further comprising a valve pin for opening and closing said secondary water inflow aperture.

7. Pressure reducer according to claim 2, characterized in that said means for alternatively opening and closing is constructed as a valve.

8. Pressure reducer for an animal watering trough comprising:
   a housing;
   a first water inflow aperture leading into said housing;
   a regulating device being arranged in said housing, said regulating device being assigned to said first water inflow aperture for alternatively opening and closing said first water inflow aperture;
   a second water inflow aperture leading into said housing, said second water inflow aperture being independent of said regulating device; and
   a selector valve means being arranged in said housing, said selector valve means being assigned to both said first water inflow aperture and said second water inflow aperture, wherein said selector valve means is movable relative to said first water inflow aperture and said second water inflow aperture for alternatively opening and closing said first water inflow aperture and closing and opening said second water flow aperture, respectively, such that when said first water inflow aperture is opened, said second water inflow aperture is closed, and when said first water inflow aperture is closed, said second water inflow aperture is opened.

* * * * *